(No Model.) 2 Sheets—Sheet 1.

D. B. MERRELL.
POTATO DIGGER.

No. 449,127. Patented Mar. 31, 1891.

WITNESSES:
Fred F. Church.
E. D. Smith

INVENTOR
Daniel B. Merrell
BY
Church & Church
His ATTORNEYS

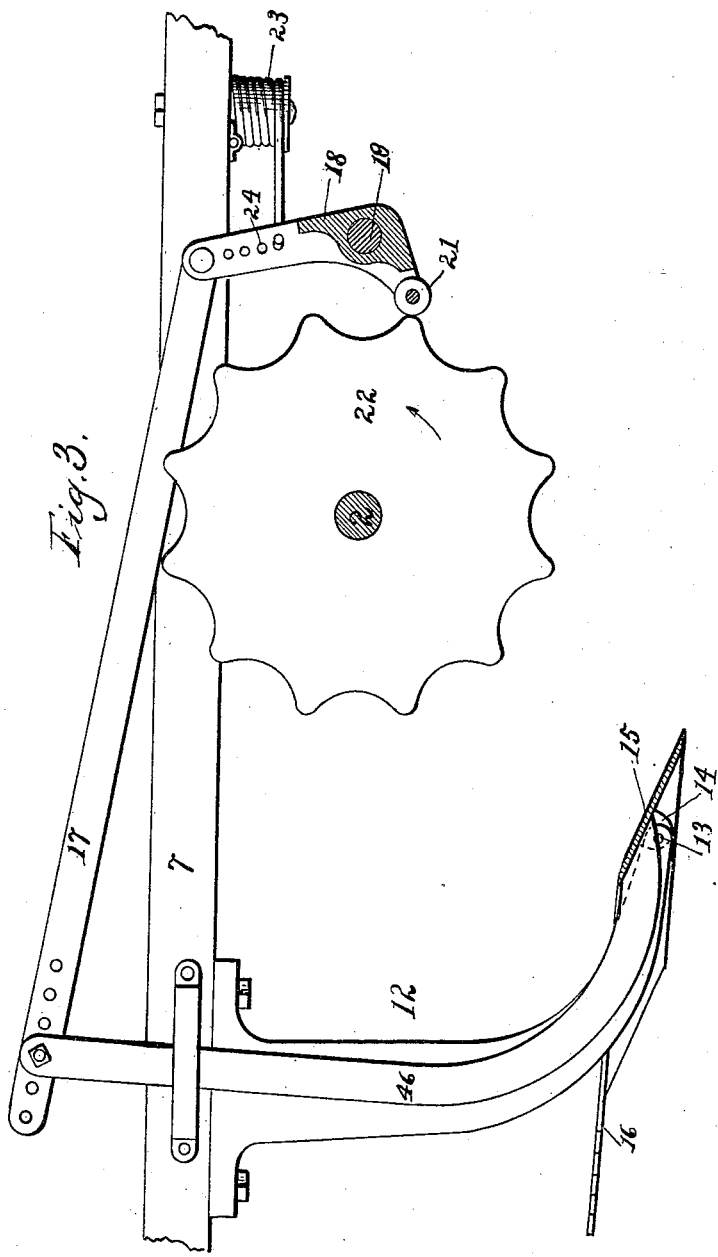

UNITED STATES PATENT OFFICE.

DANIEL B. MERRELL, OF CANANDAIGUA, ASSIGNOR OF ONE-HALF TO MILTON E. BENEDICT, OF PERRY, NEW YORK.

POTATO-DIGGER.

SPECIFICATION forming part of Letters Patent No. 449,127, dated March 31, 1891.

Application filed December 4, 1890. Serial No. 373,594. (No model.)

*To all whom it may concern:*

Be it known that I, DANIEL B. MERRELL, of Canandaigua, in the county of Ontario and State of New York, have invented certain new and useful Improvements in Potato-Diggers; and I do hereby declare the following to be a full, clear, and exact description of the same, reference being had to the accompanying drawings, forming a part of this specification, and to the figures of reference marked thereon.

My present invention has for its objects particularly to improve the construction and operation of machines or implements for digging potatoes, though some of the features hereinafter described are as readily applicable to any of that class of machines employing a share or blade entering and passing through the ground, embodying, as it does, means for facilitating the movement of said blade or share.

The invention consists in certain novel constructions and combinations of parts, all as will be hereinafter described, and the novel features pointed out particularly in the claims at the end of this specification.

Figure 1:
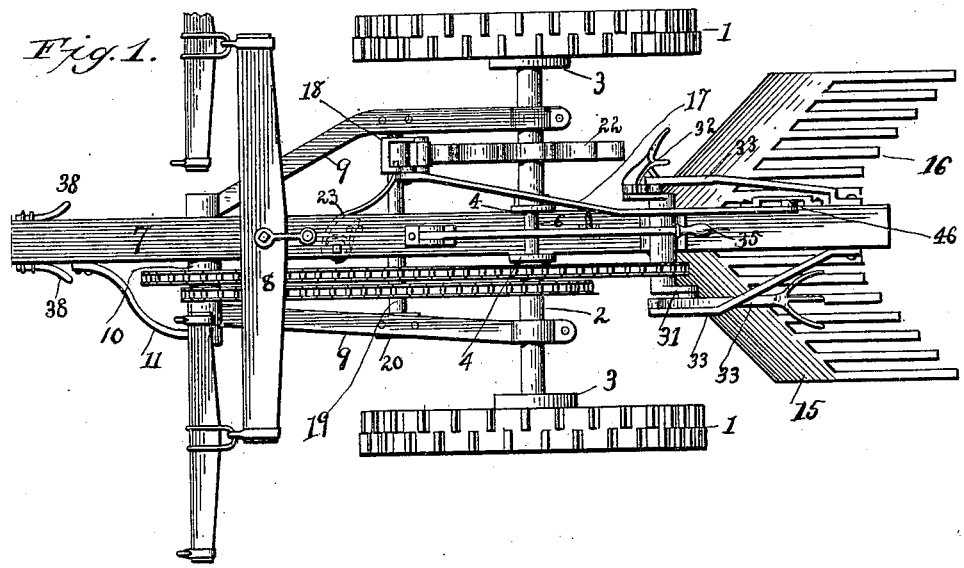
Figure 2:
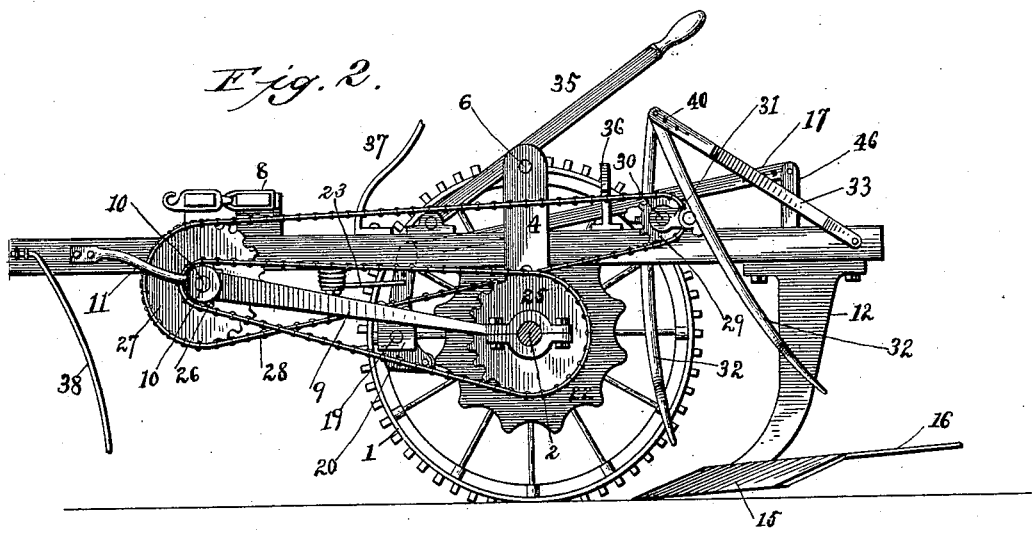

In the drawings, Figure 1 is a plan view of a machine constructed in accordance with my invention; Fig. 2, a side view of the same with one of the supporting-wheels removed, and Fig. 3 an enlarged side view of the share or shovel and its actuating devices.

Similar numerals of reference in the several figures indicate similar parts.

In carrying out my present invention I provide a pair of supporting-wheels 1, having teeth or lugs on their peripheries mounted on an axle or shaft 2, which latter is adapted to be rotated forward by said wheels, but is prevented from moving backward with them by the ordinary backing-ratchets 3, interposed between them, as usual in agricultural machinery. Mounted upon the axle 2 by suitable bearings formed in their lower ends are plates 4 4, connected by bolts 5 6, and the pole or beam 7 of the machine carrying the share, and to which the horses are connected through the evener 8, extends rearward between said plates, and when the share is down in operative position, as in Fig. 1, is supported upon bolt 5. This pole or beam is connected to the axle by two arms or braces 9 9, constituting a frame, each of said arms being journaled on the axle, while at their forward ends they are connected to a short shaft 10, mounted in a bearing on the lower side of the beam, said shaft being, however, capable of rotation by means further on described, and one of its ends is further braced by a brace or strap 11, connected to the beam, though both may be, if desired. Near the rear end of the beam is securely bolted the standard 12, carrying the share or blade, the lower end of the standard being curved and carried forward somewhat and provided with a perforation for a pivot-bolt 13, passing through lugs or ears 14 on the lower under side of the blade or share 15 near its point, forming a pivotal point upon which the share can oscillate. This share or blade is somewhat pointed at the center, and on its rear side are formed or attached fingers or teeth 16, adapted to receive the earth and potatoes dug up by the share and forming a screen or sifter separating the earth from the vegetables, the former dropping through between the fingers. For the purpose of not only facilitating the movement of the share through the ground, but also, when the fingers are attached to the share, of screening or sifting the potatoes and earth more thoroughly, I oscillate or tilt said share vertically by the following mechanism: Attached to the share 15 and passing upward beside the standard is an arm 46, pivoted at its upper end to a pitman 17, connected to a lever 18, which latter is in turn pivoted upon a rod or shaft 19, supported in bearings 20, secured to the braces 9. This lever has its lower end extended rearward and is provided with a small friction-roller 21, engaging a cam-wheel 22 on the axle, and is held in contact therewith by a spring 23, mounted on the beam and having one end engaging one of a series of holes 24 in the end of said lever. The cams or projections on wheel 22 may be shaped as shown in the drawings, or may be provided with one straight side like a ratchet-wheel, if desired; but I have found the shape shown answers all purposes. When the machine moves forward the cam-wheel is rotated and the high parts of the cams, operating on the lever 18, causes the point of the shovel to be raised as it passes through the ground, and after this part is passed the spring, which is quite strong, throws the point down again, and thereby loosens up and separates or screens the earth and potatoes on the share-fingers. This oscillation of the share therefore not only facilitates the movement of the machine, but also separates the potatoes and earth, the latter dropping between the teeth, and while an even motion, such as would be caused by an ordinary pitman connection from the axle, would answer the purpose, I find in practice that the sudden jerk given by the spring is preferable and performs the screening operation much better. It will be seen that the tension of the spring can readily be adjusted by connecting it in the holes in lever 18 nearer to or farther from the pivotal center; also, that the tilt and throw of the arm on the share or shovel can be changed as desired by changing its point of connection with the pitman 17.

Mounted upon the axle 2 is a sprocket-wheel 25, connected by a chain to a corresponding wheel 26, mounted upon shaft 10 at the front of the machine, and upon said shaft is secured a sprocket-wheel 27, connected by a chain 28 with a wheel 29 on a shaft 30 on the beam near its rear end, having oppositely-disposed cranks 31 on its ends, as shown. Pivoted upon the cranks are arms or teeth 32, having forked lower ends and resembling tedder-teeth, connected at their upper ends to the beam and guided in their movements by links 33. From the above it will be seen that the forward motion of the machine will, through the means described, cause the downward and rearward movement of the arms 32, the ends of which are arranged to strike the earth on the share at the commencement of the teeth, and the contents of the share will be projected to the rear with considerable force, thereby causing the complete separation of the soil and potatoes, so that the latter may be readily gathered. This kicking motion I find in practice not only serves to cause a better separation than where teeth or arms radially disposed around a rotary shaft are employed, but also prevents the vines, weeds, &c., from being carried up and becoming entangled on the shaft or other operating parts of the machine, as would be the case with radial arms describing a circle, the motion in the present construction is downward, rearward, and forward again, the lifting at the rear being gradual and being entirely during the backward motion.

The links 33 are provided with a series of perforations 40, with which the arms may be connected and the path traversed by the arms, thereby adjusted to produce the best results, as will be understood.

It will be noted that instead of making the shaft 10, to which the brace-rods are connected, capable of rotation with the sprocket-wheels the two latter could be formed on a sleeve or connected so as to rotate loosely thereon, the only necessity for forming a pivotal connection between the brace 9 and the beam being to permit the adjustment of the beam and share relative to the wheels, and this is caused by a lever 35, pivoted on the beam and passing backward over the bolt 6, the latter serving as a fulcrum, so that by depressing the rear end of the lever the beam will be raised and may be secured in raised position by a hook 36, engaging said lever. In lieu of this construction the ordinary means employed for causing the vertical adjustment of a beam relative to the supporting-axle may be employed.

37 indicates an ordinary seat-standard, upon which the driver's seat is mounted, as usual.

As it frequently happens that in this class of machines the vines or weeds catch or clog around the standard, I arrange upon opposite sides of the beam forward of the share teeth or arms 38, formed preferably of slightly-springy material, say, ordinary rake-teeth, which, when the machine passes over the ground, engage the vines and straightens them out parallel with the line of movement of the machine, so that they will be less liable to catch on the standard or the share-tilting arm.

It will be understood that any suitable connections between a rotary shaft and the share could be employed in lieu of those shown.

It is desirable that the oscillations of the share be comparatively frequent with relation to the speed of the advance of the implement, so that the movement of the machine will be easy and the separation of the earth and vegetables thorough.

The feature of the movable share can as well be applied to many forms of implements; but I prefer to employ it in connection with a potato-digger for the reasons stated, and also the tedder-teeth for separating the vegetables and earth, while eminently desirable in connection with oscillating share-teeth or separators, as the finer particles will drop through, could be used with an ordinary stationary share or one not provided with the teeth at the rear.

Various other modifications could readily be made without departing from the spirit of my invention, and I therefore do not desire to be confined to precisely the arrangements shown.

I claim as my invention—

1. The combination, with the rotating shaft or axle, of a standard, an opening share or blade having the rearwardly-extending arms or fingers and pivoted on a laterally-extending pivot on the standard, and connections between the share and shaft for causing the oscillation of the former by the latter, whereby the share will be moved easily through the ground and the earth on the fingers sifted, substantially as described.

2. The combination, with the beam and the standard extending downward and forward therefrom, of the share pivoted to the lower end of the standard, having the pointed end and the rearwardly-extending arms or fingers on opposite sides of the standard, and means for oscillating the share on its pivot, substantially as described.

3. The combination, with the supporting wheels and axle, of the plates mounted on the axle, the two bolts connecting them, the frame journaled on the axle, the beam pivotally connected to the frame and extending between the bolts on the plates, and the lever pivoted on the beam and co-operating with one of the bolts, substantially as described.

4. The combination, with the beam and the standard, of the share pivoted on the standard, the cam-wheel and connections between it and the share for actuating the latter in one direction on its pivot, and the spring connected to said share for actuating it in the other direction, substantially as described.

5. The combination, with the beam and the standard, of the share having the fingers thereon pivoted on the standard, the cam-wheel and connections between it and the share for actuating the latter in one direction on its pivot, and the spring connected to said share actuating it in the other direction, substantially as described.

6. The combination, with the beam and the standard, of the share pivoted on the standard, the cam-wheel, the pivoted lever connected to said share, having one end engaging the cam-wheel, and the spring operating to hold the lever in engagement with said wheel, substantially as described.

7. The combination, with the axle and supporting-wheels, the beam, and the frame pivoted to the axle and beam, of the standard, the share pivoted thereon, the cam-wheel on the axle, the lever on the frame engaging the cam-wheel and connected to the share, and the spring for actuating the share in one direction, substantially as described.

8. The combination, with the beam, the standard, and the share pivoted thereon, of the cam-wheel, the lever connected to the share and engaging the cam-wheel, and the spring on the beam connected to the lever and capable of adjustment toward and from the pivot thereof, substantially as described.

9. The combination, with the supporting-wheels and axle, the beam, and the frame pivotally connected to the axle and beam, the wheel mounted on the pivotal center between the beam and frame, a wheel on the axle and connections between it and the last-mentioned one, of the standard, a share or shovel thereon, a shaft on the beam and arms connected thereto arranged to operate on material on the share, and connections between said shaft and the wheel on the pivotal center of the beam and frame, substantially as described.

10. In a potato-digger, the combination, with a digging blade or share having the rearwardly-extending arms or fingers, of the vibratory separating arms or teeth and guiding-links for causing them to move downward at the rear of the blade proper, rearward to operate on the soil on the fingers and forward again, substantially lengthwise, whereby the material on the fingers will be separated by the combined action of the teeth and fingers, as set forth.

11. The combination, with the oscillating digging-share having the rearwardly-extending arms or fingers, of the vibratory separating arms or teeth for operating on the soil on the fingers on the share, substantially as described.

12. The combination, with the beam, the standard, the digging-share pivoted thereon, and means, substantially as described, for oscillating said share, of the shaft on the beam, the cranks thereon, the separating-arms on the cranks, and the links for guiding them, as set forth.

DANIEL B. MERRELL.

Witnesses:
C. A. CARMICHAEL,
L. M. GRAVES.